No. 874,199. PATENTED DEC. 17, 1907.
J. W. HORNER.
DENTAL SOLDERING APPARATUS.
APPLICATION FILED MAR. 23, 1907.
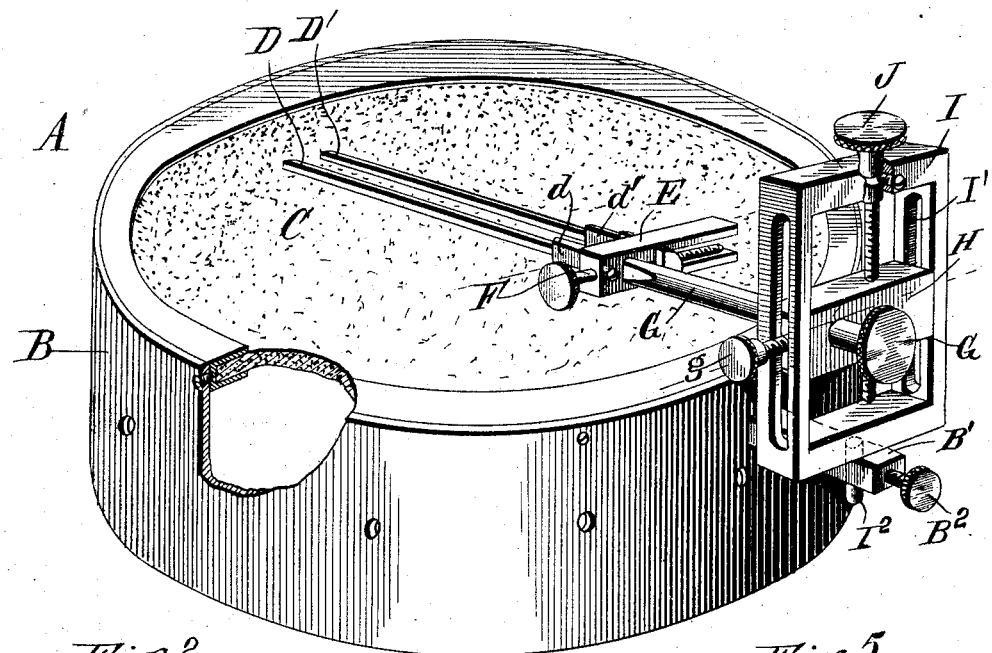
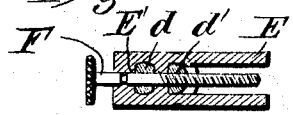
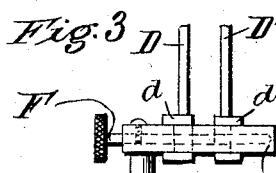
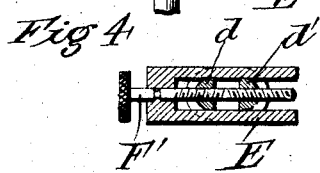
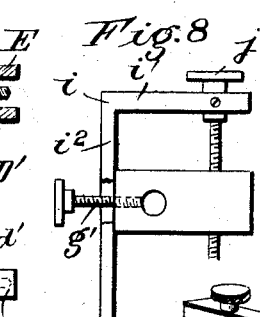
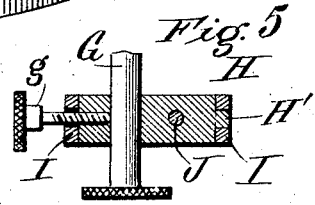
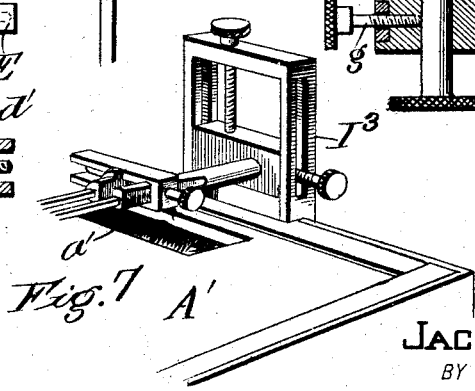
WITNESSES
INVENTOR
JACOB W. HORNER
BY
ATTORNEYS

UNITED STATES PATENT OFFICE.

JACOB W. HORNER, OF COLUMBUS, INDIANA.

DENTAL SOLDERING APPARATUS.

No. 874,199.                    Specification of Letters Patent.                    Patented Dec. 17, 1907.

Application filed March 23, 1907. Serial No. 364,036.

*To all whom it may concern:*

Be it known that I, JACOB W. HORNER, a citizen of the United States, and a resident of Columbus, in the county of Bartholomew and State of Indiana, have invented certain new and useful Improvements in Dental Soldering Apparatus, of which the following is a specification.

My invention is an improvement in soldering devices intended especially for dental use; and the invention consists in certain novel constructions and combinations of parts as will be hereinafter described and claimed.
In the drawing Figure 1 is a perspective view partly broken away and partly in section of an apparatus embodying my invention. Fig. 2 is a detail cross-sectional view showing the means for adjusting the parallel bars toward and from each other relatively. Fig. 3 is a top plan view of the construction shown in Fig. 2. Fig. 4 is a sectional view similar to Fig. 2 showing a somewhat different construction from that illustrated in Fig. 2. Fig. 5 is a cross-section on about line 5—5 of Fig. 1. Fig. 6 is a view similar to Fig. 5 showing a somewhat different construction from that shown in the said figure. Fig. 7 illustrates a somewhat different arrangement of the parts from that shown in Fig. 1 all of which will be described; and Fig. 8 illustrates a somewhat different construction of main frame for supporting the vertically movable block in which the work holding device is supported.

In carrying out my invention I provide what for convenience of reference might be termed a body portion, or bed A having a rim frame B and a top pad C secured therein.
This pad may be of asbestos, carbon, fire clay or other suitable high fusing or refractory material which will resist the action of heat and the work holder extends over this bed and consists preferably of two approximately parallel bars D and D'. These bars D and D' are supported in a carrier, and means are provided for adjusting them relatively toward and from each other in order that they may be set to properly secure the work. As shown the carrier E has a frame provided with a transverse bearing E' for a screw F which screw F journals in the carrier frame and also in the shank $d$ of the bar D and is threaded in the shank $d'$ of the bar D' so that by turning the screw F in one direction or the other the bar D' may be adjusted toward and from the bar D as will be readily understood from Figs. 1 and 2 of the drawings.

In journaling the screw F in the carrier E and holding the said screw from endwise movement, I prefer to groove it as shown in Fig. 2, and to arrange a small setscrew to intersect the said groove as will be understood from Figs. 2 and 3 of the drawings. Manifestly instead of simply adjusting one of the bars toward and from the other the relative adjustment of the bars may be effected by operating both bars by the screw and this is illustrated in Fig. 4, in which the screw F' is journaled in the carrier frame in like manner to the screw F and is provided with the right and left threads engaging with corresponding bearings in the shanks of the two work holding bars, as will be understood from Fig. 4.

The carrier E is suitably supported so it may be rotated in order to turn the work holders to any desired position, and this is effected by providing the said carrier frame with a shaft G journaled in a suitable support shown as a block H, the said shaft G having a handle whereby it may be turned and a clamping screw $g$ being threaded on the block H and arranged to bear against the shaft G in order to secure it in any rotary adjustment. It is also desirable to provide for setting the work holder at different heights above the pad and this is accomplished by adjusting the block H vertically in its frame I, the block H being suitably guided in the said frame I, and a screw J being journaled in said frame I and threaded in the block H so it may be turned to raise and lower the said block in the use of the invention.

In guiding the block H in the frame I, the said block may be provided at its ends with projections H' operating in upright slots I' in the side bars of the frame I, as best shown in Fig. 5, or the block may be grooved in its ends as shown at H² in Fig. 6 to embrace the side bars of the frame.

In Fig. 8 I show a somewhat different construction of main frame. In this construction the frame $i$ is made with a top bar $i'$ in which the screw $j$ for adjusting the block is journaled and the frame also has but one side bar $i^2$ slotted for the passage of the clamping screw $g'$ for holding the shaft of the carrier in any desired rotary adjustment.

By the described construction it will be noticed the work holder may be adjusted up or down, may be rotated bodily and the bars of the holder may be adjusted toward and from each other. It is desired, however, in some instances to adjust the work holder laterally over the pad and this I accomplish by mounting the frame I to rotate on a vertical axis so it may be turned to swing the work holder laterally over the pad. In the construction shown the frame I has a depending stud $I^2$ journaled in the bar $B'$ projecting from the frame B, the said bar having a setscrew $B^2$ to bear against the stud $I^2$ and hold the frame in any suitable adjustment. This permits the work holder to be swung laterally over the pad, as may be desired in the use of the invention.

In Fig. 1 the main frame is supported laterally beyond the outer edge of the bed and this may be desired because it leaves the bed entirely unobstructed. It may, however, be desirable in some instances to mount the movable frame on the bed as shown in Fig. 7 in which the main frame $I^3$ is supported on the bed at one edge of the latter and the bed $A'$ is slotted at $a'$ for the passage of the end of the carrier frame in rotating the said frame, as will be understood from the said Fig. 7.

As suggested, the invention is especially designed for dental use and in such use in making anterior gold crowns, the crown may be swaged up in two pieces and these two pieces set up between the two parallel bars with the top or apex of the crown resting on the asbestos. The two bars may now be adjusted by the screw so as to engage the opposite sides of the crown and hold it in place until soldered and these bars can be raised or lowered and rotated jointly and separately or brought together to suit the various classes of work. In doing porcelain crown work or Richmond crown work the device is especially useful for holding the pin in position while a solder is being flowed around it. In making the abutment for the porcelain crown, the platinum cap is fitted to the root to be crowned; then the pin is driven through the cap into the root canal and the pin and cap withdrawn from the root together. The cap is placed on top of the two parallel bars or wires which must be rotated so as to conform to the contour of the special case. The pin is then passed downwardly between the wires and the whole lowered by the operation of the proper screw until the point of the pin just touches and rests upon the asbestos bed when the flame can be played on it and the solder flowed without any danger of the pin shifting its position.

The approximately parallel bars or wires D and $D'$ may be of any high fusing material, as will be well understood by those skilled in the art.

By the construction shown in Fig. 1 it will be noticed the main frame may be adjusted to swing the work holding devices over the mat to any desired position or entirely off the mat, or the main frame with its attached parts may be removed bodily to permit the use of the bed, as a soldering block without the crown devices whenever desired.

I claim—

1. An apparatus herein described comprising a pad, a pair of approximately parallel bars, a carrier for said bars, a screw supported in said carrier and operating to adjust the said bars relatively toward and from each other, a shaft extending from said carrier, a block in which the said shaft is journaled and movable longitudinally, a screw in the block and engaging the shaft for securing the same in different adjustments, a frame in which said block is movable vertically, a screw in the frame for moving the block vertically, a support to which said frame is pivoted vertically, and means for securing the frame in any desired adjustment on its said vertical pivot, substantially as and for the purposes set forth.

2. An apparatus substantially as described, comprising a work holder having means for securing the work and consisting of approximately parallel bars, and means for adjusting said bars relatively toward and from each other, a shaft supporting said work-holder and a block in which said shaft is movable longitudinally and may be turned.

3. A work holder, comprising a pair of approximately parallel bars, and a carrier therefor having means for adjusting the bars relatively toward and from each other, a shaft supporting said work holder, a block in which said shaft is movable longitudinally and may be turned, a frame, and means securing the block adjustably in the frame.

4. An apparatus substantially as described comprising a pair of approximately parallel bars, a carrier therefor extending transversely of the bars and one of the bars being movable laterally, in said carrier, and a screw in the carrier and engaging the said bar whereby to adjust the same laterally.

5. The combination with the bed, of the main frame pivoted vertically in connection therewith whereby it may be swung on said pivot, a block adjustable vertically in the main frame, and a work holder having a shaft adjustable in said block.

6. The combination of a main frame, a block movable vertically in said frame and having an opening forming a bearing for a work holder shaft, a screw for adjusting the block up and down in the main frame, a screw intersecting the bearing opening, a shaft in said bearing opening, and movable rotarily and longitudinally therein, a carrier on said shaft, approximately parallel bars supported by said carrier, and a screw in the carrier for adjusting said bars, relatively toward and from each other, substantially as set forth.

JACOB W. HORNER.

Witnesses:
 JOHN W. DONAKER,
 WILLIAM H. BUTLER.